US012631742B2

(12) United States Patent
Balon et al.

(10) Patent No.: US 12,631,742 B2
(45) Date of Patent: May 19, 2026

(54) METHOD FOR ESTIMATING AMBIGUOUS VELOCITY OF TARGET

(71) Applicant: HUIZHOU DESAY SV AUTOMOTIVE CO., LTD., Guangdong (CN)

(72) Inventors: Siegfred Balon, Guangdong (CN); Hongning Ruan, Guangdong (CN); Zhen Roland Huang, Guangdong (CN)

(73) Assignee: HUIZHOU DESAY SV AUTOMOTIVE CO., LTD., Guangdong (CN)

( * ) Notice: Subject to any disclaimer, the term of this patent is extended or adjusted under 35 U.S.C. 154(b) by 271 days.

(21) Appl. No.: 18/284,080

(22) PCT Filed: Jun. 25, 2021

(86) PCT No.: PCT/CN2021/102240
§ 371 (c)(1),
(2) Date: Sep. 26, 2023

(87) PCT Pub. No.: WO2022/252311
PCT Pub. Date: Dec. 8, 2022

(65) Prior Publication Data
US 2024/0302520 A1 Sep. 12, 2024

(30) Foreign Application Priority Data
Jun. 4, 2021 (CN) .......................... 202110627559.7

(51) Int. Cl.
*G01S 13/58* (2006.01)
*G01S 7/41* (2006.01)

(52) U.S. Cl.
CPC ............ *G01S 13/584* (2013.01); *G01S 7/415* (2013.01)

(58) Field of Classification Search
CPC ........ G01S 13/584; G01S 7/415; G01S 7/354; G01S 7/356; G01S 13/347; G01S 13/931; G01S 13/343; G01S 13/58
See application file for complete search history.

(56) References Cited

U.S. PATENT DOCUMENTS

| | | | | |
|---|---|---|---|---|
| 9,739,879 | B2 * | 8/2017 | Rohling | ................ G01S 13/345 |
| 11,525,908 | B2 * | 12/2022 | Laghezza | .............. G01S 13/583 |
| 2017/0363715 | A1 * | 12/2017 | Li | .......................... G01S 13/581 |

* cited by examiner

*Primary Examiner* — William Kelleher
*Assistant Examiner* — Ismaaeel A. Siddiquee
(74) *Attorney, Agent, or Firm* — Birchwood IP

(57) ABSTRACT

The present application relates to a method for estimating an ambiguous velocity of a target. The method includes: alternately transmitting a first waveform signal and a second waveform signal at a first center frequency and a second center frequency respectively; processing intermediate frequency signals of the first waveform signal and a second waveform signal to generate a first Range-Doppler matrix and a second Range-Doppler matrix respectively; acquiring the quantity of phase convolutions based on a phase difference between the first Range-Doppler matrix and the second Range-Doppler matrix and a beat frequency of the second waveform signal; and estimating a target velocity and a target range through the quantity of phase convolutions. The method has the following beneficial effects; an aliased region and velocity estimation are further improved by using information from a Doppler frequency shift difference, so that the estimation of the ambiguous velocity is more reliable.

11 Claims, 5 Drawing Sheets

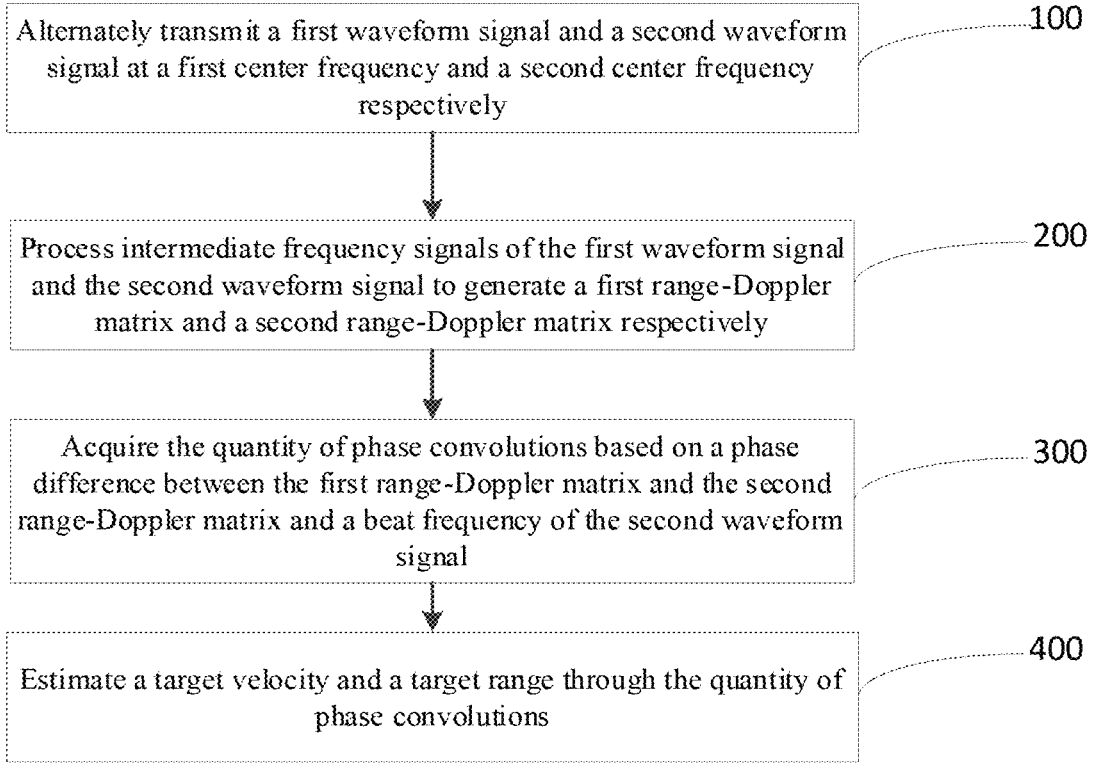

Alternately transmit a first waveform signal and a second waveform signal at a first center frequency and a second center frequency respectively — 100

Process intermediate frequency signals of the first waveform signal and the second waveform signal to generate a first range-Doppler matrix and a second range-Doppler matrix respectively — 200

Acquire the quantity of phase convolutions based on a phase difference between the first range-Doppler matrix and the second range-Doppler matrix and a beat frequency of the second waveform signal — 300

Estimate a target velocity and a target range through the quantity of phase convolutions — 400

FIG.1

METHOD FOR ESTIMATING AMBIGUOUS VELOCITY OF TARGET

TECHNICAL FIELD

The present application relates to the technical field of automotive electronics, in particular to a method for estimating an ambiguous velocity of a target.

BACKGROUND OF THE INVENTION

It is very important for automotive sensors to accurately estimate the position and velocity of a target while detecting the target. Some key functions of automotive radar, such as adaptive cruise control (ACC) and automatic emergency braking (AEB), depend entirely on the accuracy of velocity estimation. In order to determine whether a fast moving target may have an impact on the driving safety of a vehicle, it is especially important to accurately estimate the velocity thereof, which determines whether an alarm message may be sent in a timely and accurate manner, and thus a driver or a driverless vehicle may make appropriate judgments. In the design of the automotive radar, there are three parameters that have strong correlation with velocity: the maximum sensing range, the range resolution and the maximum sensing velocity. However, due to the waveform design of the radar, they are in a mutually constrained relationship, so it is not possible to optimize all three parameters simultaneously, but only to find a balance among the three parameters.

A method for estimating an ambiguous velocity is provided in "METHOD AND DEVICE FOR DETERMINING SPACING AND RADIAL VELOCITY OF OBJECT BY USING RADAR SIGNALS-CN104246534B" and "FAST LINEAR FMCW RADAR-CN105103003B" by using frequency modulated continuous wave (FMCW) of a carrier frequency shift. In the above-mentioned documents, the amount of the carrier frequency shift is constrained due to the phenomenon of phase convolutions, and accordingly, the range of the maximum sensing velocity is also limited.

BRIEF SUMMARY OF THE INVENTION

In order to overcome the problem about estimation of a velocity and a range of an ambiguous region in the prior art, the present application provides a method for estimating an ambiguous velocity of a target.

A method for estimating an ambiguous velocity of a target is applied to a radar sensor, and includes:

alternately transmitting a first waveform signal and a second waveform signal at a first center frequency and a second center frequency respectively;

processing intermediate frequency signals of the first waveform signal and the second waveform signal to generate a first Range-Doppler matrix and a second Range-Doppler matrix respectively;

acquiring the quantity of phase convolutions based on a phase difference between the first Range-Doppler matrix and the second Range-Doppler matrix and a beat frequency of the second waveform signal; and estimating a target velocity and a target range through the quantity of phase convolutions.

Optionally, the first waveform signal and the second waveform signal have the same bandwidth, and the first center frequency is not equal to the second center frequency.

Optionally, the processing intermediate frequency signals of the first waveform signal and the second waveform signal to generate a first Range-Doppler matrix and a second Range-Doppler matrix respectively includes:

after constructing data matrices for the intermediate frequency signals of the first waveform signal and the intermediate frequency signals of the second waveform signal respectively, obtaining the first Range-Doppler matrix and the second Range-Doppler matrix by two-dimensional Fourier transform processing.

Optionally, after constant false early warning detection and parameter acquisition, the phase difference $\Delta\phi$ between the first Range-Doppler matrix and the second Range-Doppler matrix is further calculated by the following formula:

Range-Doppler matrix is further calculated by the following formula:

$$\Delta\phi = 2\pi\left[(f_{c,B} - f_{C,A})\frac{2R}{c} + \frac{2vT_{PRI}}{c}f_{c,B}\right] \qquad (1)$$

$$\text{where } \phi_A = 2\pi f_{C,A}\frac{2R}{c},$$

$$\phi_B = 2\pi\left[f_{c,B}\frac{2R}{c} + \frac{2vT_{PRI}}{c}f_{c,b}\right], f_{AB} = f_{c,B} - f_{c,A}, T_{PRI}$$

denotes a sweep frequency period, and $$\phi_1 = 2\pi f_{AB}\frac{2R}{c} \qquad (2)$$

and $\phi_2 = 2\pi f_{DB}T_{PRI}$ (3) are enabled.

Optionally, the beat frequency of the second waveform signal is calculated by the following formula:

$$f_{beat,B} = \frac{2R_i}{c}\frac{BW}{T_{PRI}} + f_{DBi} \qquad (4)$$

where BW denotes the bandwidth, $T_{PRI}$ denotes the sweep frequency period, and $f_{DB}$ denotes a Doppler frequency shift of the second waveform signal, that is, $$f_{DB} = \frac{2v}{c}f_{c,B}. \qquad (15)$$

Optionally, phases of the first waveform signal and the second waveform signal have periodicity, and from formula (2), it is obtained that $\phi_1$ is proportional to R, thereby obtaining:

$$\phi_1 = M \cdot 2\pi + 2\pi f_{AB}\frac{2R_\Delta}{c} \qquad (5)$$

$$\text{where } 2\pi f_{AB}\frac{2R_\Delta}{c}$$

denotes a phase of $\phi_1$ convoluted into $[-\pi, \pi]$, and M is an integer and calculated by the following formula:

$$\phi_1 = M \cdot 2\pi + 2\pi f_{AB} \frac{2R_\Delta}{c} \qquad (5)$$

$$\text{where } 2\pi f_{AB} \frac{2R_\Delta}{c}$$

denotes a phase of $\phi_1$ convoluted into $[-\phi, \phi]$, and M is an integer and calculated by the following formula:

$$M \cong \text{round}\left( \frac{f_{beat,B} \cdot \frac{T_{PRI}}{BW}}{\frac{1}{f_{AB}}} \right); \qquad (6)$$

and an actual phase difference $\Delta\phi$ is a $2\pi$ period of the corresponding quantity of convolutions of an estimated phase difference $\Delta\phi_{RDM}$, that is, $\Delta\phi = \Delta\phi_{RDM} + M \cdot 2\pi + m \cdot 2\pi$, so the actual phase difference is calculated by the following formula:

$$\Delta\phi_{RDM} + M \cdot 2\pi + m_i \cdot 2\pi - 2\pi f_{AB}\frac{2R_i}{c} + 2\pi f_{DBi} T_{PRI} \qquad (7)$$

where $m_i$ is an integer, with a range of $[-m_{max}, \ldots, -2,-1,0,1,2, m_{max}]$; and $R_i$ and $f_{DBi}$ denote a range and a Doppler frequency shift corresponding to $m_i$.

Optionally, the acquiring the quantity of phase convolutions based on a phase difference between the first Range-Doppler matrix and the second Range-Doppler matrix and a beat frequency of the second waveform signal further includes the following steps:

acquiring the Doppler frequency shift $f_{DBi}$ and the quantity of convolutions $q_i$ corresponding to $m_i$ based on the minimum ambiguous Doppler frequency difference;

obtaining a convolution estimated value $q_{est}$ based on a Doppler frequency shift difference; and obtaining the quantity q of phase convolutions based on $q_i$ and $q_{est}$.

Optionally, the acquiring $q_i$ and $f_{DBi}$ based on the minimum ambiguous Doppler frequency difference includes:

calculating a corresponding aliased Doppler frequency $f_{DB,RD,i}$ through $f_{DBi}$ by the following formula:

$$f_{DB,RD,i} = f_{DBi} - 2q_i f_{D,max} \qquad (8)$$

when $f_{DBi}$ is greater than $f_{D,max}$ or smaller than $-f_{D,max}$, that is, $|f_{DBi}| > f_{D,max}$, estimating $q_i$ by the following formula:

$$q_i = \text{sign}(f_{DBi}) \cdot \text{round}\left( \frac{f_{DBi} - f_{D,max}}{2 \cdot f_{D,max}} \right) \qquad (9)$$

where sign $(f_{DBi})$ determines $q_i$ as a positive number or a negative number, and round refers to rounding; and by comparing the aliased Doppler frequency $f_{DB,RD,i}$ with an actual aliased Doppler frequency $f_{DB,aliased}$, when $|f_{DB,RD,i} - f_{DB,aliased}|$ is the smallest, acquiring $q_i$ and $f_{DBi}$, where the actual aliased Doppler frequency $f_{DB,aliased}$ is obtained through the first Range-Doppler matrix and the second Range-Doppler matrix.

Optionally, the obtaining a convolution estimated value $q_{est}$ of the quantity of convolutions based on a Doppler frequency shift difference includes:

obtaining an estimated velocity based on the Doppler frequency difference between the first waveform signal and the second waveform signal by the following formula:

$$v_{est} = \frac{f_{DB,aliased} - f_{DA,aliased}}{2 f_{AB}} \cdot c; \qquad (10)$$

and estimating the convolution estimated value $q_{est}$ through the estimated velocity by the following formula:

$$q_{est} = \text{round}\left( \frac{\frac{2v_{est}}{c} f_{c,A} - f_{DA,aliased}}{2 f_{D,max}} \right) \approx \text{round}\left( \frac{\frac{2v_{est}}{c} f_{c,B} - f_{DB,aliased}}{2 f_{D,max}} \right). \qquad (11)$$

Optionally, the obtaining the quantity q of convolutions based on $q_i$ and $q_{est}$ includes:

calculating velocities and ranges corresponding to $q_i$ and $q_{est}$ respectively through $q_i$ and $q_{est}$, and acquiring the quantity q of phase convolutions by an optimization iteration algorithm.

Optionally, the optimization iteration algorithm at least includes one of likelihood estimation, Bayesian estimation, and statistical entropy.

Optionally, the estimating a target velocity and a target range through the quantity of phase convolutions includes:

obtaining the aliased Doppler frequency $f_{DB,RD,i}$ by formula (8), and obtaining the target velocity based on the aliased Doppler frequency $f_{DB,RD,i}$ and the Doppler frequency shift of the second waveform signal; and calculating the target range through the beat frequency of the second waveform signal.

Compared with the prior art, the present application has the following beneficial effects: the first Range-Doppler matrix and the second Range-Doppler matrix in the present application have phase convolutions, and a plurality of possible range values and velocity values appear, resulting in ambiguity. According to the present application, the target range and the target velocity are estimated through joint estimation, and phase compensation caused by the ambiguous velocity is not needed. Moreover, the calculation of the ambiguous velocity is not limited by a frequency shift $f_{AB}$ in the prior art. Therefore, waveform design parameters are selected flexibly. Meanwhile, an aliased region and velocity estimation are further improved by using information from the Doppler frequency shift difference, which makes the estimation of the ambiguous velocity more reliable.

BRIEF DESCRIPTION OF THE DRAWINGS

FIG. 1 is a schematic diagram of a method according to an embodiment of the present application.

DETAILED DESCRIPTION OF THE INVENTION

Figure 2:
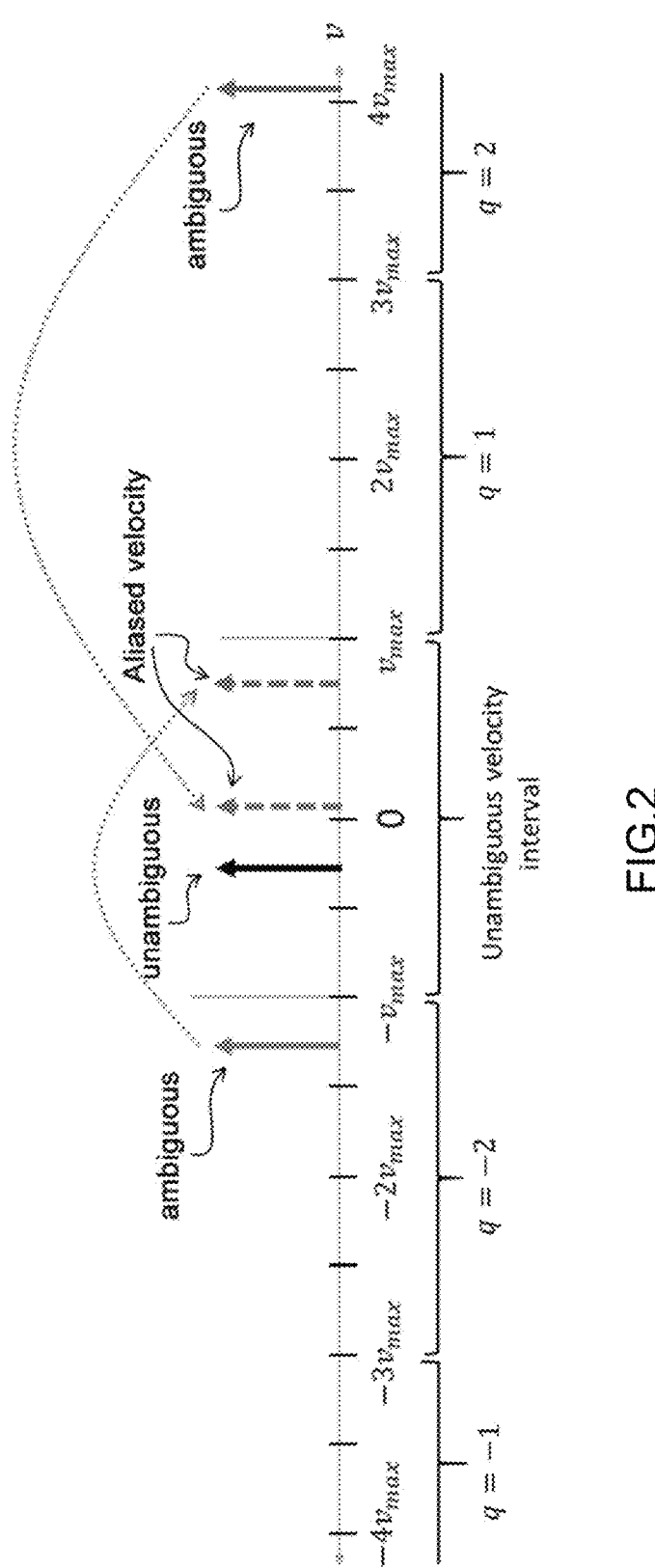
FIG. 2 is a schematic diagram of an ambiguous velocity and how the ambiguous velocity is aliased into an unambiguous region according to an embodiment of the present application.

The present application will be further illustrated below in conjunction with the detailed description.

The same or similar numbers in the accompanying drawings of the embodiments of the present application correspond to the same or similar components. In the description of the present application, it should be understood that the terms "upper", "lower", "left", "right", "top", "bottom", "inside", "outside", etc. indicate orientations or positional relationships based on the orientations or positional relationships shown in the accompanying drawings, and are merely for the convenience of describing the present application and simplifying the description, rather than indicating or implying that the referred devices or components must have a specific orientation, be constructed and operated in a specific orientation, so the terms describing the positional relationship in the accompanying drawings are for illustrative purposes merely and should not be construed as limitations on the patent.

In addition, the terms "first", "second", etc. are used for descriptive purposes merely, primarily to distinguish between different devices, components or parts (specific types and configurations may be the same or different), not to indicate or imply relative importance and number of the referred devices, components or parts, and thus they should not be construed as indicating or implying relative importance.

In the embodiments shown in FIG. 1 to FIG. 7, the present application provides a method for estimating an ambiguous velocity of a target. The method is applied to a radar sensor, and includes:

Step 100: Alternately transmit a first waveform signal and a second waveform signal at a first center frequency and a second center frequency respectively. In step 100, the first waveform signal and the second waveform signal have the same bandwidth, and the first center frequency is not equal to the second center frequency.

Step 200: Process intermediate frequency signals of the first waveform signal and the second waveform signal to generate a first Range-Doppler matrix and a second Range-Doppler matrix respectively. In step 200, the processing intermediate frequency signals of the first waveform signal and the second waveform signal to generate a first Range-Doppler matrix and a second Range-Doppler matrix respectively includes: after constructing data matrices for the intermediate frequency signals of the first waveform signal and the intermediate frequency signals of the second waveform signal respectively, obtain the first Range-Doppler matrix and the second Range-Doppler matrix by two-dimensional Fourier transform processing.

Step 300: After constant false early warning detection and parameter acquisition, acquire the quantity of phase convolutions based on a phase difference between the first Range-Doppler matrix and the second Range-Doppler matrix and a beat frequency of the second waveform signal. In step 300, the acquiring the quantity of phase convolutions based on a phase difference between the first Range-Doppler matrix and the second Range-Doppler matrix and a beat frequency of the second waveform signal includes the following steps: acquire a Doppler frequency shift $f_{DBi}$ and the quantity of convolutions $q_i$ corresponding to $m_i$ based on the minimum ambiguous Doppler frequency difference; obtain a convolution estimated value $q_{est}$ based on a Doppler frequency shift difference; and obtain the quantity q of phase convolutions based on $q_i$ and $q_{est}$.

Step 400: Estimate a target velocity and a target range through the quantity of phase convolutions. In step 400, the estimating a target velocity and a target range through the quantity of phase convolutions includes: obtain an aliased Doppler frequency $f_{DB,RD,i}$ through formula 8, and obtain the target velocity through the aliased Doppler frequency $f_{DB,RD,i}$; and calculate the target range through formula (4).

The first Range-Doppler matrix and the second Range-Doppler matrix in the present application have phase convolutions, and a plurality of possible velocity values appear, resulting in ambiguity. According to the present application, the target range and the target velocity are estimated through joint estimation, and phase compensation caused by the ambiguous velocity is not needed. Moreover, the calculation of the ambiguous velocity is not limited by an assumed frequency shift $f_{AB}$ in the prior art. Therefore, waveform design parameters are selected flexibly. Meanwhile, an aliased region and velocity estimation are further improved by using information from the Doppler frequency shift difference, which makes the estimation of the ambiguous velocity more reliable.

Figure 3:
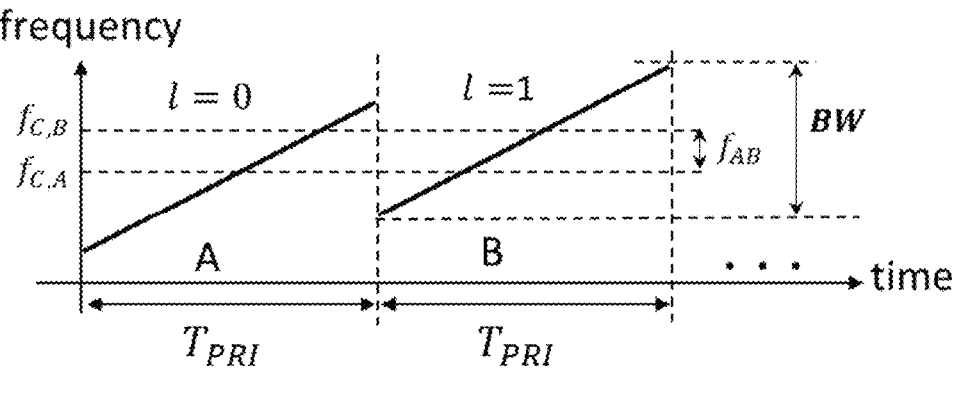
FIG. 3 is an FMCW oscillogram of a carrier frequency shift according to an embodiment of the present application.

In some embodiments, the first waveform signal and the second waveform signal have the same bandwidth, and the first center frequency is not equal to the second center frequency. In this embodiment, a series of chirped signals with the same bandwidth but different center frequencies are alternately emitted for a special waveform in the present application, that is, the first waveform signal A with a center frequency being the first center frequency $f_{c,A}$ and the second waveform signal B with a center frequency being the second center frequency $f_{c,B}$ are alternately emitted. Referring to FIG. 3, BW denotes the sweep frequency bandwidth, and $T_{PRI}$ denotes a sweep frequency period. IF signals generated under different waveforms may be written as follows:

$$x_{IF,A} \approx A_{IF} \cdot \exp\left( j2\pi\left[ f_{c,A}\tau + (f_{beat,A})t - \frac{1}{2}\frac{BW}{T_{PRI}}\tau^2 \right] \right) \quad (12)$$

$$x_{IF,B} \approx A_{IF} \cdot \exp\left( j2\pi\left[ f_{c,B}\tau + (f_{beat,B})t - \frac{1}{2}\frac{BW}{T_{PRI}}\tau^2 \right] \right) \quad (13)$$

where $\tau$ denotes a corresponding time delay under the first waveform signal A (l=0, 2, 4, . . . ) and the second wave signal (l=1, 3, 5, . . . ).

In some embodiments, the processing intermediate frequency signals of the first waveform signal and the second waveform signal to generate a first Range-Doppler matrix and a second Range-Doppler matrix respectively includes:

7

Figure 4:
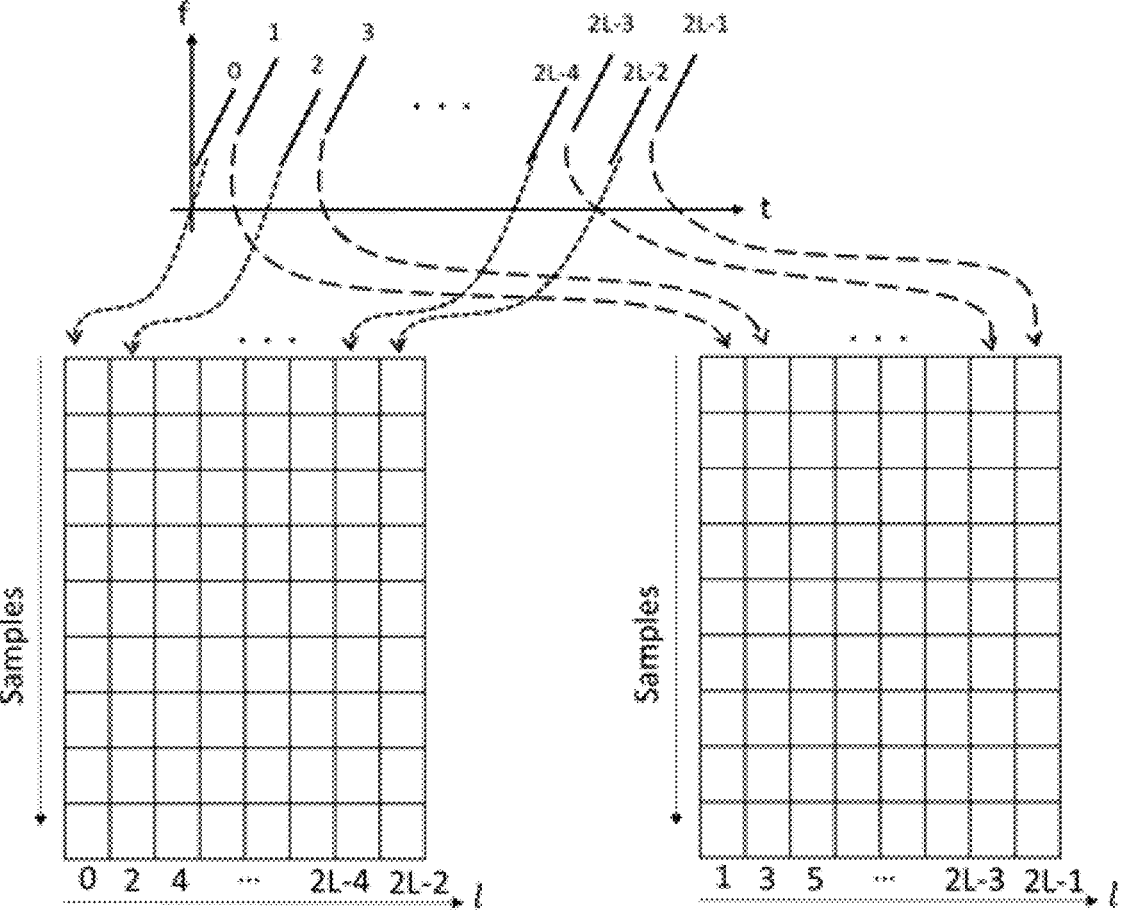
FIG. 4 is a schematic diagram of original data construction of waveforms A and B according to an embodiment of the present application.
Figure 5:
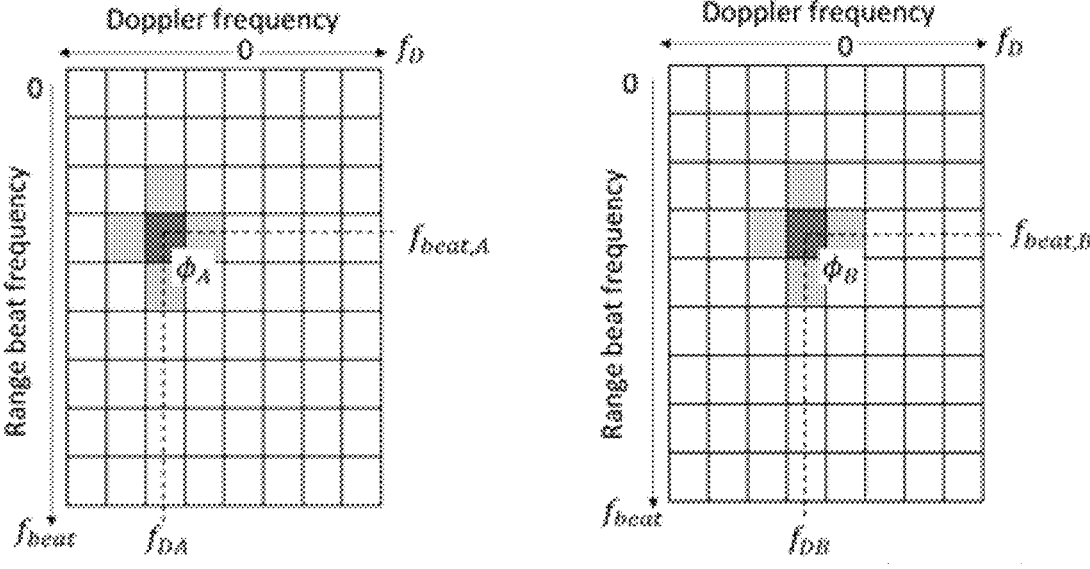
FIG. 5 is a schematic diagram of RD matrices of waveforms A and B of a single target according to an embodiment of the present application, where a velocity corresponding to a Doppler frequency shift is correct when the velocity is not ambiguous.

8 after constructing the data matrices for the intermediate frequency signals of the first waveform signal and the intermediate frequency signals of the second waveform signal respectively, obtain the first Range-Doppler matrix and the second Range-Doppler matrix by two-dimensional Fourier transform processing, constant false early warning detection, and parameter acquisition. In this embodiment, referring to FIG. 4, two original data matrices are formed by the intermediate frequency signals of the first waveform signal A (l=0, 2, 4, . . . ) and the second waveform signal (l=1, 3, 5, . . . ) respectively. The first Range-Doppler matrix and the second Range-Doppler matrix in FIG. 5 are generated through two-dimensional fast Fourier transform (FFT) and constant false early warning.

In some embodiments, a phase difference $\Delta\phi$ between the first Range-Doppler matrix and the second Range-Doppler matrix is calculated by the following formula:

$$\Delta\phi = 2\pi \left[ (f_{c,B} - f_{C,A}) \frac{2R}{c} + \frac{2vT_{PRI}}{c} f_{c,B} \right] \quad (1)$$

$$\text{where } \phi_A = 2\pi f_{C,A} \frac{2R}{c},$$

$$\phi_B = 2\pi \left[ f_{c,B} \frac{2R}{c} + \frac{2vT_{PRI}}{c} f_{c,B} \right], f_{AB} = f_{c,B} - f_{c,A}, T_{PRI}$$

denotes the sweep frequency period, and $$\phi_1 = 2\pi f_{AB} \frac{2R}{c} \quad (2)$$

and $\phi_2 = 2\pi f_{DB} T_{PRI}$ (3) are enabled.

In the above embodiment, a phase of the first waveform signal A in the first Range-Doppler matrix is:

$$\phi_A = 2\pi f_{C,A} \frac{2R}{c},$$

and a phase of the second waveform signal B in the second Range-Doppler matrix is:

$$\phi_B = 2\pi \left[ f_{c,B} \frac{2R}{c} + \frac{2vT_{PRI}}{c} f_{c,B} \right].$$

Thus, the phase difference between the two RD matrices under the waveform A and B is:

$$\Delta\phi = \phi_B - \phi_A = \phi_1 + \phi_2 = 2\pi \left[ (f_{c,B} - f_{C,A}) \frac{2R}{c} + \frac{2vT_{PRI}}{c} f_{c,b} \right].$$

$$\text{where } f_{AB} = f_{c,B} - f_{c,A}, \text{ and } \phi_1 = 2\pi f_{AB} \frac{2R}{c} \quad (2)$$

$$\text{and } \phi_2 = 2\pi f_{DB} T_{PRI} \quad (3)$$

are enabled.

In some embodiments, the beat frequency of the second waveform signal is calculated by the following formula:

$$f_{beat,B} = \frac{2R_i}{c} \frac{BW}{T_{PRI}} + f_{DBi}, \quad (4)$$

where BW denotes the bandwidth, $T_{PRI}$ denotes the sweep frequency period, $f_{DB}$ denotes a Doppler frequency shift of the second waveform signal, that is, $$f_{DB} = \frac{2v}{c} f_{c,B}, \quad (15)$$

and $f_{c,B}$ denotes a carrier frequency of the second waveform signal. $\Delta\phi = \phi_B - \phi_A$ and $f_{beat,B}$ may both be estimated through the first Range-Doppler matrix and the second Range-Doppler matrix in FIG. 5.

In one implementation of the above embodiment, phases of the first waveform signal and the second waveform signal have periodicity, and from formula (2), it may be obtained that $\phi_1$ is proportional to R, thereby obtaining:

$$\phi_1 = M \cdot 2\pi + 2\pi f_{AB} \frac{2R_\Delta}{c} \quad (5)$$

where $$2\pi f_{AB} \frac{2R_\Delta}{c}$$

denotes a phase of $\phi_1$ convoluted into $[-\pi, \pi]$, and M is an integer and calculated by the following formula:

$$M \cong \text{round} \left( \frac{f_{beat \cdot B} \cdot \frac{T_{PRi}}{BW}}{\frac{2}{f_{AB}}} \right). \quad (6)$$

An actual phase difference $\Delta p$ is a $2\pi$ period of the corresponding quantity of convolutions of an estimated phase difference $\Delta\phi_{RDM}$, that is, $\Delta\phi = \Delta\phi_{RDM} + M \cdot 2\pi + m$. $2\pi$, thereby calculating the actual phase difference by the following formula:

$$\Delta\phi_{RDM} + M \cdot 2\pi + m_i \cdot 2\pi = 2\pi f_{AB} \frac{2R_i}{c} + 2\pi f_{DBi} T_{PRi}, \quad (7)$$

where $m_i$ is an integer, with a range of $[-m_{max}, \ldots, -2, -1, 0, 1, 2, m_{max}]$; and $R_i$ and $f_{DBi}$ denote a range and a Doppler frequency shift corresponding to $m_i$.

In some embodiments, the acquiring the quantity of phase convolutions based on a phase difference between the first Range-Doppler matrix and the second Range-Doppler matrix and a beat frequency of the second waveform signal includes the following steps:

the Doppler frequency shift $f_{DBi}$ and the quantity $q_i$ of convolutions corresponding to $m_i$ are acquired based on the minimum ambiguous Doppler frequency difference. In one implementation of this embodiment, the corresponding aliased Doppler frequency $f_{DB,RD,i}$ is calculated through $f_{DBi}$ by the following formula:

$$f_{DB,RD,i} = f_{DBi} - 2q_i f_{D,max}. \quad (8)$$

When $f_{DBi}$ is greater than $f_{D,max}$ or smaller than $-f_{D,max}$, $q_i$ is estimated by the following formula:

$$q_i = \text{sign}\ (f_{DBi}) \cdot \text{round}\ \left(\frac{f_{DBi} - f_{D \cdot max}}{2 \cdot f_{D \cdot max}}\right), \tag{9}$$

where sign ($f_{DBi}$) determines $q_i$ as a positive number or a negative number, and round refers to rounding.

The aliased Doppler frequency $f_{DB,RD,i}$ is compared with an actual aliased Doppler frequency $f_{DB,aliased}$, and when $|f_{DB,RD,i} - f_{DB,aliased}|$ is the smallest, $q_i$ and $f_{DBi}$ are acquired. The actual aliased Doppler frequency $f_{DB,aliased}$ is obtained through the first Range-Doppler matrix and the second Range-Doppler matrix.

The convolution estimated velocity $q_{est}$ is obtained through the Doppler frequency shift difference. In one implementation of this embodiment, an estimated velocity is obtained based on a Doppler frequency difference between the first waveform signal and the second waveform signal by the following formula:

$$v_{est} = \frac{f_{DB,aliased} - f_{DA,aliased}}{2 f_{AB}} \cdot c. \tag{10}$$

The convolution estimated value $q_{est}$ is estimated through the estimated velocity by the following formula:

$$q_{est} = \text{round}\left(\frac{\frac{2v_{est}}{c} f_{c,A} - f_{DA \cdot aliased}}{2 f_{D \cdot max}}\right) \approx \text{round}\left(\frac{\frac{2v_{est}}{c} f_{c,B} - f_{DB \cdot aliased}}{2 f_{D \cdot max}}\right). \tag{11}$$

The quantity q of phase convolutions is obtained based on $q_i$ and $q_{est}$. In one implementation of this embodiment, velocities and ranges corresponding to $q_i$ and $q_{est}$ respectively are calculated based on $q_i$ and $q_{est}$, and optimization iteration is performed through likelihood estimation to acquire the quantity q of convolutions. In addition, the present application may also perform optimization by Bayesian estimation, statistical entropy, and other algorithms.

In one embodiment, the estimating a target velocity and a target range through the quantity of phase convolutions includes:

obtain an aliased Doppler frequency $f_{DB,RD,i}$ by formula (8), and obtain the target velocity through the aliased Doppler frequency $f_{DB,RD,i}$ and the Doppler frequency shift of the second waveform signal. In this embodiment, upon acquiring the optimal quantity q of phase convolutions, q is substituted into formulas (4) and (7) to acquire correct $R_i$ and $f_{DBi}$; then $f_{DBi}$ is substituted into formula (8) to acquire an unambiguous aliased Doppler frequency $f_{DB,RD,i}$; and the unambiguous aliased Doppler frequency $f_{DB,RD,i}$ is substituted into the Doppler frequency shift of the second waveform signal, that is, formula $$f_{DB} = \frac{2v}{o} f_{c,B}, \tag{15}$$

so a final velocity may be calculated. Meanwhile, the target range is calculated based on the beat frequency of the second waveform signal. That is, the final target range may be calculated by $$f_{beat,B} = \frac{2R_i}{c} \frac{BW}{T_{PRi}} + f_{DB}.$$

In some embodiments, a series of chirped signals with the same bandwidth but different center frequencies are alternately emitted for a special waveform in the present application, that is, the first waveform signal A with a center frequency being the first center frequency $f_{c,A}$ and the second waveform signal B with a center frequency being the second center frequency $f_{c,B}$ are alternately emitted. Referring to FIG. 3, BW denotes the sweep frequency bandwidth, and $T_{PRI}$ denotes the sweep frequency period. IF signals generated under different waveforms may be written as follows:

$$x_{IF \cdot A} \approx A_{IF} \cdot \exp\left(j2\pi\left[f_{c,A}\tau + (f_{beat \cdot A})\ t - \frac{1}{2}\frac{BW}{T_{PRi}}\tau^2\right]\right) \tag{12}$$

$$x_{IF \cdot B} \approx A_{IF} \cdot \exp\left(j2\pi\left[f_{c,B}\tau + (f_{beat \cdot B})\ t - \frac{1}{2}\frac{BW}{T_{PRi}}\tau^2\right]\right) \tag{13}$$

where $\tau$ denotes a corresponding time delay under the first waveform signal A (l=0, 2, 4, . . . ) and the second wave signal B (l=1, 3, 5, . . . ). As shown in FIG. 4, the intermediate frequency signals from A and B form two original data matrices. After two-dimensional FFT, the Range-Doppler matrices as shown in FIG. 5 are generated, that is, the first Range-Doppler matrix and the second Range-Doppler matrix.

The phase of the first waveform signal A in the first Range-Doppler matrix is:

$$\phi_A = 2\pi f_{C \cdot A} \frac{2R}{c},$$

and the phase of the second waveform signal B in the second Range-Doppler matrix is:

$$\phi_B = 2\pi\left[f_{c,B} \frac{2R}{c} + \frac{2vT_{PRi}}{c} f_{c,B}\right].$$

Thus, the phase difference between the two RD matrices under the waveform A and B is:

$$\Delta\phi = \phi_B - \phi_A = \phi_1 + \phi_2 = 2\pi\left[(f_{c,B} - f_{C,A})\frac{2R}{c} + \frac{2vT_{PRi}}{c} f_{c,B}\right]. \tag{1}$$

where $$f_{AB} = f_{c,B} - f_{c,A}, \tag{2}$$

and $$\phi_1 = 2\pi f_{AB} \frac{2R}{c}$$

are enabled.

The Doppler frequency shift of the second waveform signal B is $$f_{DB} = \frac{2v}{c} f_{c,B},$$

and in addition, the beat frequency $f_{beat,B}$ of the waveform B is $$f_{beat-B} = \frac{2R}{c}\frac{BW}{T_{PRi}} + f_{DB}. \qquad (4)$$

It may be seen that $\Delta\phi = \phi_B - \phi_A$ and $f_{beat,B}$ may both be estimated from the first Range-Doppler matrix and the second Range-Doppler matrix in FIG. 5. The Doppler frequency $f_{DB}$ in (4) is unknown. When the velocity of a moving object is so high that a Doppler frequency thereof exceeds $f_{Dmax}$, a velocity obtained from the RD diagram is not an actual velocity of the object, but an aliased or ambiguous velocity. Therefore, the present application is to solve the ambiguous velocity and restore an actual velocity.

Figure 7:
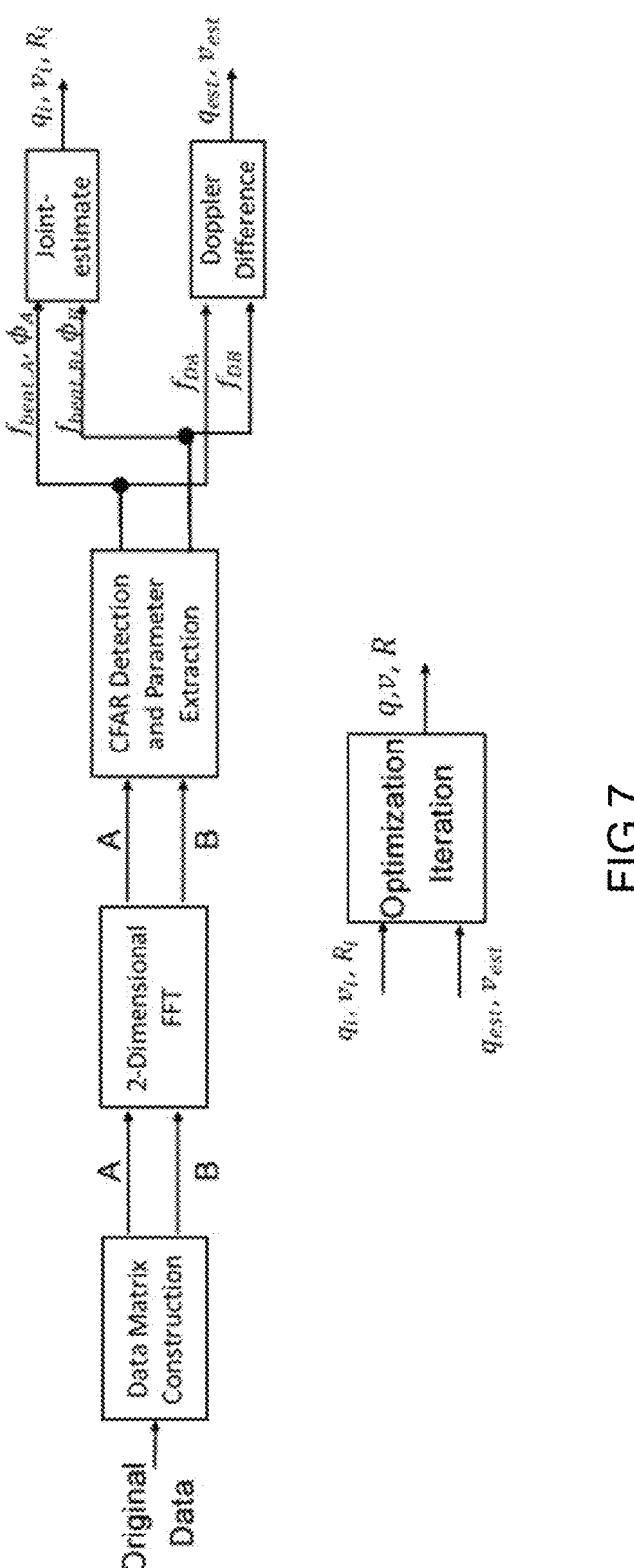
FIG. 7 is a flow diagram of a velocity ambiguity-resolving algorithm according to an embodiment of the present application.

The basic principle of the present application is to calculate the range R and the Doppler frequency $f_{DB}$ by combining (1) with (4).FIG. 7 shows a flow of this method for illustration.

The phase in formula (1) is used for velocity estimation, and there are two points to consider here. Firstly, it may be seen from (2) that $\phi_1$ has a linear relationship with R. Apparently, the greater R, the greater $\phi_1$. Because the patent solution has no constraint on the amplitude of the movement of the center frequencies of the waveforms A and B, the range of $\phi_1$ may even exceed $[-\pi, \pi]$. As the phases have the periodicity of $2\pi$, $\phi_1$ may be expressed as follows:

$$\phi_1 = 2\pi f_{AB}\frac{2R}{c} = 2\pi f_{AB}\frac{2(M \cdot R_{AB} + R_\Delta)}{c} = M \cdot 2\pi + 2\pi f_{AB}\frac{2R_\Delta}{c} \qquad (5)$$

where M is an integer, $$2\pi f_{AB}\frac{2R_\Delta}{c}$$

is a phase of $\phi_1$ convoluted into $[-\pi, \pi]$, and $\phi_1$ is a representation of $$2\pi f_{AB}\frac{2R_\Delta}{c} \qquad (45)$$

with $2\pi$ as a period. $R_{AB}$ denotes an ambiguous range caused by the shift of the center frequency of the waveforms A and B, expressed as follows:

$$R_{AB} = \frac{c}{2f_{AB}}. \qquad (14)$$

Although $R_A$ and $\phi_1$ (R is unknown) in (4) are unknown, M may still be obtained by the following beat frequency (4):

$$M \approx \text{round}\left(\frac{f_{beat,B} \cdot \frac{T_{PRi}}{BW}}{\frac{1}{f_{AB}}}\right). \qquad (6)$$

Figure 6:
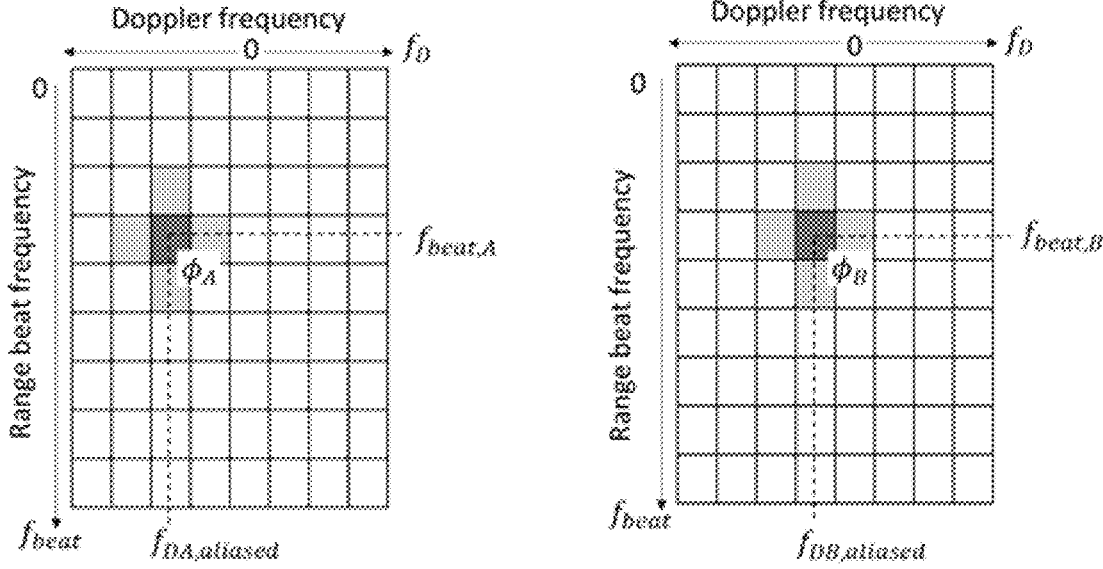
FIG. 6 is a schematic diagram of RD matrices of waveforms A and B of a single target, where a Doppler frequency shift is aliased into an unambiguous region when a velocity is ambiguous.

Secondly, a phase $\phi_2$ associated with the Doppler frequency may also exceed $[-\phi, \phi]$, so that the ambiguous Doppler frequency is $$f_{DB} = f_{DB_{aliased}} + 2qf_{D,max},$$

where $f_{DB}$ denotes an actual Doppler frequency obtained based on the velocity, $f_{DB_{aliased}}$ denotes the aliased Doppler frequency obtained from the RD diagram in FIG. 6, q is an integer and denotes the number of an aliased region, and $f_{D,max}$ denotes the maximum Doppler frequency measured from the RD diagram, expressed as follows:

$$f_{D,max} = 2|v_{max}|\frac{f_{c,B}}{c} = \frac{1}{2} \cdot \frac{1}{2T_{PRI}};$$

$$\phi_2 = 2\pi\left[f_{DB_{aliased}} + 2qf_{D,max}\right]T_{PRI} =$$

$$2\pi\left[f_{DB_{aliased}} + 2q\frac{1}{2} \cdot \frac{1}{2T_{PRI}}\right]T_{PRI} = 2\pi\left[f_{DB_{aliased}}T_{PRI} + q\frac{1}{2}\right]$$

As may be seen from the above, depending on the target velocity, there may be a plurality of convolutions. The greater the velocity, the greater q.

Although the quantity q of phase convolutions caused by the target velocity is unknown, the correct phase, velocity, and range may be determined by likelihood estimation. In conclusion, the phase difference in equation (1) may be rewritten as:

$$\Delta\phi = M \cdot 2\pi + 2\pi f_{AB}\frac{2R_\Delta}{c} + 2\pi f_{DB}T_{PRI}.$$

The phase difference estimated based on the RD diagram obtained from the first waveform signal A and the second waveform signal B may also have a convolution of $2\pi$:

$$\Delta\phi_{RDM} = \text{mod}\left(2\pi f_{AB}\frac{2R_\Delta}{c} + 2\pi f_{DB}T_{PRI}, 2\pi\right).$$

The actual phase difference is a plurality of $2\pi$ periods of $\Delta\phi_{RDM}$, that is, $$\Delta\phi = \Delta\phi_{RDM} + M \cdot 2\pi + m \cdot 2\pi$$

where m is an integer determined by the quantity of phase convolutions, and is proportional to the Doppler frequency shift $f_{DB}$.

The purpose of this algorithm is to simultaneously estimate the range and the ambiguous Doppler frequency shift $f_{DB}$ by the following two formulas:

$$\Delta\phi_{RDM} + M \cdot 2\pi + m_i \cdot 2\pi = 2\pi f_{AB}\frac{2R_i}{c} + 2\pi f_{DBi}T_{PRI} \qquad (7)$$

$$f_{beat,B} = \frac{2R_i}{c}\frac{BW}{T_{PRI}} + f_{DBi} \qquad (4)$$

The two formulas have three unknown numbers: $m_i$, $R_i$, and $f_{DBi}$. $m_i$ is an integer, with a range of $[-m_{max}) . . . , -2,-1,0,1,2, m_{max}]$. With different $m_i$, different $R_i$ and $f_{DBi}$ may be obtained In formula (7), for different $m_i$, different $R_i$ and $f_{DBi}$ may be provided. Correct $R_i$ and $f_{DBi}$ are obtained by an optimization iteration method according to the following three steps. The steps are as follows:

Step 1: The Minimum Ambiguous Doppler Frequency Difference

Assuming that $q_i$ is known, a corresponding aliased Doppler frequency $f_{DB,RD,i}$ of each $f_{DBi}$ may be calculated by the following formula:

$$f_{DB,RD,i} = f_{DBi} - 2q_i f_{D,max} \qquad (8)$$

Referring to FIG. 2, when $f_{DBi}$ appears within an ambiguous interval, that is, being greater than $f_{D,max}$ or smaller than $-f_{D,max}$, $q_i$ is estimated by the following formula:

$$q_i = \text{sign}(f_{DBi}) \text{ round} \left( \frac{f_{DBi} - f_{D,max}}{2 \cdot f_{D,max}} \right) \qquad (9)$$

As $q_i$ may be either a positive integer or a negative integer, a sign thereof is determined by the Doppler frequency $f_{DBi}$. All $f_{DB,RD,i}$ obtained by (8) are compared with the actual aliased Doppler frequency $f_{DB,aliased}$ obtained from the RD diagram, and the correct $q_i$ and $f_{DBi}$ enable $|f_{DB,RD,i} - f_{DB,aliased}|$ to be the smallest.

Step 2: Obtain the Estimated Value $q_{est}$ of q Based on the Doppler Frequency Shift Difference Another reference parameter is the Doppler frequency shift difference on the RD diagram of the waveforms A and B. The Doppler frequency shift has the following relationship with the carrier frequency:

$$f_{DA} = \frac{2v}{c} f_{c,A}$$

$$f_{DB} = \frac{2v}{c} f_{c,B}$$

where a difference between $f_{DA}$ and $f_{DB}$ is:

$$f_{DB} - f_{DA} = \frac{2v}{c} f_{AB};$$

Assuming that the Doppler frequency is aliased (or ambiguous), in the same aliased region, the difference $$f_{DB} - f_{DA} = \frac{2v}{c} f_{AB}$$

between $f_{DA}$ and $f_{DB}$ may be simplified as:

$$f_{DB,aliased} - f_{DA,aliased} = \frac{2v}{c} f_{AB},$$

Thus, based on $v_{est}$, the aliased region may be estimated as:

$$q_{est} = \text{round} \left( \frac{\frac{2v_{est}}{c} f_{c,A} - f_{DA,aliased}}{2F_{D,max}} \right) \approx \text{round} \left( \frac{\frac{2v_{est}}{c} f_{c,A} - f_{DA,aliased}}{2F_{D,max}} \right) \qquad (11)$$

Step 3: Optimization Iteration

For $q_i$ and $q_{est}$ calculated from the above two criteria, estimated values thereof are not accurate in some practical scenarios, such as a low signal-to-noise ratio. Therefore, in order to further obtain a more accurate estimated value of q, optimization iteration needs to be performed by combining $q_i$ and $q_{est}$, and the corresponding velocities and ranges obtained therefrom, that is, $v_i$, $v_{est}$, $R_i$, and Rest so that the accuracy of q is improved, which make an estimation result thereof more robust compared with the prior art. There are various optimize iteration methods, such as likelihood estimation.

The optimal q is firstly found by iterative optimization, and then the corresponding unambiguous Doppler frequency is found by (8), thereby obtaining v; and then R is obtained through (4).

In some embodiments, the calculation process of q may be described with reference to FIG. 2 as follows: since $f_{DBi}$ exceeds an unambiguous interval $[-f_{D,max}, f_{D,max}]$, assuming that a distance between $f_{DBi}$ and the unambiguous interval is $d=f_{DBi}-f_{D,max}$ and the width of each interval is $2f_{D,max}$, $f_{DBi}$ appears at an interval corresponding to the number of times of d over $2f_{D,max}$.

Apparently, the above embodiments of the present application are merely examples of the present application for purposes of clarity and are not intended to limit the implementations of the present application. Changes or modifications in other different forms may also be made by a person of ordinary skill in the art on the basis of the above description. All implementations need not to be, and cannot be, exhaustive. Any modification, equivalent substitution, improvement, etc. made within the spirit and principles of the present application shall fall within the protection scope of the claims of the present application.

What is claimed is:

1. A method for estimating an ambiguous velocity of a target, wherein the method is applied to a radar sensor, and comprises:
alternately transmitting a first waveform signal and a second waveform signal at a first center frequency and a second center frequency respectively;
processing intermediate frequency signals of the first waveform signal and the second waveform signal to generate a first Range-Doppler matrix and a second Range-Doppler matrix respectively;
acquiring the quantity of phase convolutions based on a phase difference between the first Range-Doppler matrix and the second Range-Doppler matrix and a beat frequency of the second waveform signal; and
estimating a target velocity and a target range through the quantity of phase convolutions;
after constant false early warning detection and parameter acquisition, the phase between the first Range-Doppler matrix and the second Range-Doppler difference $\Delta\phi$ between the first Range-Doppler matrix and the second Range-Doppler matrix is calculated by the following formula:

$$\Delta\phi = 2\pi \left[ (f_{c,B} - f_{C,A}) \frac{2R}{c} + \frac{2vT_{PRI}}{c} f_{c,B} \right] \qquad (1)$$

wherein $$\phi_A = 2\pi f_{C,A} \frac{2R}{c}, \phi_B = 2\pi \left[ f_{c,B} \frac{2R}{c} + \frac{2vT_{PRI}}{c} f_{c,B} \right], f_{AB} = f_{c,B} - f_{c,A}, T_{PRI}$$ (5)

denotes a sweep frequency period, and $$\phi_1 = 2\pi f_{AB} \frac{2R}{c}$$ (2)

and $$\phi_2 = 2\pi f_{DB} T_{PRI}$$ (3)

are enabled.

2. The method for estimating an ambiguous velocity of a target according to claim 1, wherein the first waveform signal and the second waveform signal have the same bandwidth, and the first center frequency is not equal to the second center frequency.

3. The method for estimating an ambiguous velocity of a target according to claim 1, wherein the processing intermediate frequency signals of the first waveform signal and the second waveform signal to generate a first Range-Doppler matrix and a second Range-Doppler matrix respectively comprises:

after constructing data matrices for the intermediate frequency signals of the first waveform signal and the intermediate frequency signals of the second waveform signal respectively, obtaining the first Range-Doppler matrix and the second Range-Doppler matrix by two-dimensional Fourier transform processing.

4. The method for estimating an ambiguous velocity of a target according to claim 1, wherein the beat frequency of the second waveform signal is calculated by the following formula:

$$f_{beat,B} = \frac{2R_i}{c} \frac{BW}{T_{PRI}} f_{DB}$$ (4)

wherein BW denotes the bandwidth, $T_{PRI}$ denotes the sweep frequency period, and $f_{DB}$ denotes a Doppler frequency shift of the second waveform signal, that is, $$f_{DB} = \frac{2v}{c} f_{c,B}.$$ (15)

5. The method for estimating an ambiguous velocity of a target according to claim 4, wherein phases of the first waveform signal and the second waveform signal have periodicity, and from formula (2), it is obtained that $\phi_1$ is proportional to R, thereby obtaining:

$$\phi_1 = M \cdot 2\pi + 2\pi f_{AB} \frac{2R_\Delta}{c}$$ (5)

wherein $2\pi f_{AB} \frac{2R_\Delta}{c}$ wherein $$2\pi f_{AB} \frac{2R_\Delta}{c}$$

denotes a phase of $\phi_1$ convoluted into $[-\pi, \pi]$, and M is an integer and calculated by the following formula:

$$M \cong \text{round}\left( \frac{f_{beat,B} \cdot \frac{T_{PRI}}{BW}}{\frac{1}{f_{AB}}} \right);$$ (6)

an actual phase difference $\Delta\phi$ is a $2\pi$ period of the corresponding quantity of convolutions of an estimated phase difference $\Delta\phi_{RDM}$, that is, $\Delta\phi = \Delta\phi_{RDM} + M \cdot 2\pi + m \cdot 2\pi$, thereby calculating the actual phase difference by the following formula:

$$\Delta\phi_{RDM} + M \cdot 2\pi + m_i \cdot 2\pi = \cdot 2\pi f_{AB} \frac{2R_i}{c} + 2\pi f_{DBi} T_{PRI}$$ (7)

wherein $m_i$ is an integer, with a range of $[-m_{max}, \ldots, -2, -1, 0, 1, 2, m_{max}]$; and $R_i$ and $f_{DBi}$ denote a range and a Doppler frequency shift corresponding to $m_i$.

6. The method for estimating an ambiguous velocity of a target according to claim 5, wherein the acquiring the quantity of phase convolutions based on a phase difference between the first Range-Doppler matrix and the second Range-Doppler matrix and a beat frequency of the second waveform signal further comprises the following steps:

acquiring the Doppler frequency shift $f_{DBi}$ and the quantity of convolutions $q_i$ corresponding to $m_i$ based on the minimum ambiguous Doppler frequency difference;

obtaining a convolution estimated value $q_{est}$ based on a Doppler frequency shift difference; and obtaining the quantity q of phase convolutions based on $q_i$ and $q_{est}$.

7. The method for estimating an ambiguous velocity of a target according to claim 6, wherein the acquiring the Doppler frequency shift $f_{DBi}$ and the quantity $q_i$ of convolutions corresponding to $m_i$ based on the minimum ambiguous Doppler frequency difference comprises:

calculating a corresponding aliased Doppler frequency $f_{DB,RD,i}$ through $f_{DBi}$ by the following formula:

$$f_{DB,RD,i} = f_{DBi} - 2q_i f_{D,max};$$ (8)

when $f_{DBi}$ exceeds the maximum Doppler frequency, that is, $|f_{DBi}| > f_{D,max}$, estimating $q_i$ by the following formula:

$$q_i - \text{sign}(f_{DBi}) \cdot \text{round}\left( \frac{f_{DBi} - f_{D,max}}{2 \cdot F_{D,max}} \right),$$ (9)

wherein $\text{sign}(f_{DBi})$ determines $q_i$ as a positive number or a negative number, and round refers to rounding; and by comparing the aliased Doppler frequency $f_{DB,RD,i}$ with an actual aliased Doppler frequency $f_{DB,aliased}$, when $|f_{DB,RD,i} - f_{DB,aliased}|$ is the smallest, acquiring $q_i$ and $f_{DBi}$ wherein the actual aliased Doppler frequency $f_{DB,aliased}$ is obtained through the first Range-Doppler matrix and the second Range-Doppler matrix.

8. The method for estimating an ambiguous velocity of a target according to claim 7, wherein the obtaining a convolution estimated value $q_{est}$ of the quantity of convolutions based on a Doppler frequency shift difference comprises:

obtaining an estimated velocity based on the Doppler frequency difference between the first waveform signal and the second waveform signal by the following formula:

$$v_{est} = \frac{f_{DE,aliased} - f_{DAd,aliased}}{2f_{AB}} \cdot c; \tag{10}$$

estimating the convolution estimated value $q_{est}$ through the estimated velocity by the following formula:

$$q_{est} = \text{round}\left(\frac{\frac{av_{est}}{c}f_{\tau,A} - f_{DA,aliased}}{2F_{D,max}}\right) \approx \text{round}\left(\frac{\frac{av_{est}}{c}f_{\tau,A} - f_{DA,aliased}}{2F_{D,max}}\right). \tag{11}$$

18

9. The method for estimating an ambiguous velocity of a target according to claim 8, wherein the obtaining the quantity q of phase convolutions based on $q_i$ and $q_{est}$ comprises:

finally acquiring the quantity q of phase convolutions through $q_i$, $q_{est}$ and the corresponding velocity and range by an optimization iteration algorithm.

10. The method for estimating an ambiguous velocity of a target according to claim 9, wherein the optimization iteration algorithm at least comprises one of likelihood estimation, Bayesian estimation, and statistical entropy.

11. The method for estimating an ambiguous velocity of a target according to claim 9, wherein the estimating a target velocity and a target range through the quantity of phase convolutions comprises:

obtaining the aliased Doppler frequency $f_{DB,RD,i}$ by formula (8), and obtaining the target velocity through the aliased Doppler frequency $f_{DB,RD,i}$ and the Doppler frequency shift of the second waveform signal; and calculating the target range through the beat frequency of the second waveform signal.

* * * * *